(12) United States Patent
Willaert et al.

(10) Patent No.: US 9,973,072 B2
(45) Date of Patent: May 15, 2018

(54) POWER CONVERTER STAGE, CONTROLLER, AND METHOD FOR PROVIDING POWER TO CONTROLLER

(71) Applicant: PHILIPS LIGHTING HOLDING B.V., Eindhoven (NL)

(72) Inventors: Jurgen Margriet Antonius Willaert, Nuenen (NL); Dalibor Cvoric, Utrecht (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 101 days.

(21) Appl. No.: 14/438,230

(22) PCT Filed: Oct. 16, 2013

(86) PCT No.: PCT/IB2013/059394
§ 371 (c)(1),
(2) Date: Apr. 24, 2015

(87) PCT Pub. No.: WO2014/064579
PCT Pub. Date: May 1, 2014

(65) Prior Publication Data
US 2015/0288273 A1 Oct. 8, 2015

Related U.S. Application Data

(60) Provisional application No. 61/718,270, filed on Oct. 25, 2012.

(51) Int. Cl.
*H02M 1/08* (2006.01)
*H02M 3/158* (2006.01)
(Continued)

(52) U.S. Cl.
CPC ............ *H02M 1/08* (2013.01); *H02M 3/157* (2013.01); *H02M 3/1582* (2013.01);
(Continued)

(58) Field of Classification Search
CPC ........ H02M 1/08; H02M 3/157; H02M 3/158; H02M 3/156; H02M 3/1582;
(Continued)

(56) References Cited

U.S. PATENT DOCUMENTS 5,179,508 A * 1/1993 Lange ................... H02J 7/0065
323/222
5,623,397 A * 4/1997 Vinciarelli ........ H02M 3/33576
363/16
(Continued)

FOREIGN PATENT DOCUMENTS

| EP | 0386989 A2 | 5/1998 |
| EP | 2506420 A2 | 10/2012 |
| JP | 2009171776 A | 7/2009 |

*Primary Examiner* — Gustavo Rosario Benitez
(74) *Attorney, Agent, or Firm* — Akarsh P. Belagodu (57) ABSTRACT

The invention relates to a power converter stage (2) for providing power supply to a power converter controller (3), a power converter controller (3) for such power converter stage (2), a power converter (1) including such power converter stage (2) and such power converter controller (3), a method for providing power to a controller (3) of a power converter (1) and a software product for controlling a power converter (1). In order to provide for auxiliary power supply for control circuitry of a power converter (1) during all operation modes of the power converter (1) while avoiding additional costs involved with providing a dedicated control power supply fed from bus voltage, it is proposed that power stored in power storing means (4, 5) included in a power converter stage (2) or more generally in a power converter (1) are used for supply to the controller (3) even if the power converter is in stand-by mode, as a transfer of power between such power storing means (4,5) through a primary inductance (6) may be used for providing also for a power transfer to a secondary inductance (7), which then supplies the controller (3).

14 Claims, 4 Drawing Sheets (51) Int. Cl.
*H02M 3/157* (2006.01)
*H02M 1/00* (2006.01)
*H02M 3/155* (2006.01)
*H02M 3/335* (2006.01)

(52) U.S. Cl.
CPC .......... *H02M 3/1588* (2013.01); *H02M 3/335* (2013.01); *H02M 2001/0006* (2013.01); *H02M 2001/0032* (2013.01); *H02M 2003/1552* (2013.01); *Y02B 70/16* (2013.01)

(58) Field of Classification Search
CPC ............. H02M 3/1588; H02M 1/4225; H02M 2001/0006; H02M 2001/0035; H02M 2001/0032; H02M 2003/1552; Y02B 70/16
See application file for complete search history.

(56) References Cited

U.S. PATENT DOCUMENTS

| | | | |
|---|---|---|---|
| 6,157,177 A | 12/2000 | Feldtkeller | |
| 6,295,213 B1* | 9/2001 | Smith | H02M 3/33569 363/21.01 |
| 6,434,030 B1 | 8/2002 | Rehm et al. | |
| 6,441,590 B1 | 8/2002 | Amantea et al. | |
| 7,529,105 B1 | 5/2009 | Choi et al. | |
| 8,023,295 B1* | 9/2011 | Shekhawat | H02J 3/383 363/21.04 |
| 2007/0115695 A1* | 5/2007 | Lou | H02M 3/1582 363/16 |
| 2009/0316454 A1* | 12/2009 | Colbeck | H02M 1/4225 363/89 |
| 2010/0314945 A1* | 12/2010 | Yamazaki | H02M 3/157 307/80 |
| 2011/0084648 A1* | 4/2011 | Cao | H01M 10/44 320/103 |
| 2012/0026759 A1 | 2/2012 | Balakrishnan et al. | |
| 2012/0068537 A1* | 3/2012 | Hintz | B60L 11/005 307/43 |
| 2013/0038127 A1* | 2/2013 | King | B60L 11/1857 307/64 |

\* cited by examiner

POWER CONVERTER STAGE, CONTROLLER, AND METHOD FOR PROVIDING POWER TO CONTROLLER

CROSS-REFERENCE TO PRIOR APPLICATIONS

This application is the U.S. National Phase application under 35 U.S.C. § 371 of International Application No. PCT/IB13/059394, filed on Oct. 16, 2013, which claims the benefit of U.S. Provisional Patent Application No. 61/718,270, filed on Oct. 25, 2012. These applications are hereby incorporated by reference herein.

FIELD OF THE INVENTION

This invention is related to an implementation of an auxiliary supply that feeds control circuitry of power converter during both normal and stand-by operations of a power converter. In particular, the present invention is related to a power converter stage for providing power supply to a power converter controller, a power converter controller for such power converter stage, a power converter including such power converter stage and such power converter controller, a method for providing power to a controller of a power converter and a software product for controlling a power converter.

BACKGROUND OF THE INVENTION

All conventional power converters require auxiliary supply for feeding the control circuitry of the power converter.

The power converter can comprise one or more power stages, wherein there are some approaches known for implementation of such auxiliary supply, which may even be combined.

One approach includes that the auxiliary supply is integrated in one or more stages of power converter (e.g. by integration into a PFC (Power Factor Correction) by means of placing an auxiliary winding on the PFC inductor), and the one or more power stages in operation as used for generating the auxiliary supply. However, if the power converter is not active, e.g. set to stand-by mode, also the auxiliary supply is cut off and the converter control circuitry is not supplied with power anymore.

Another approach includes that the auxiliary supply is not integrated but implemented as an independent part of converter (e.g. by using an additional flyback converter which is fed from, for example, the bus (or mains) voltage). This approach allows for independently delivering power to the control circuitry during any mode of operation. However, a disadvantage of this approach are increased costs due to a larger number of components required and, typically, larger costs of individual components.

SUMMARY OF THE INVENTION

It is an object of the present invention to provide for auxiliary power supply for control circuitry of a power converter during all operation modes of the power converter while avoiding additional costs involved with providing a dedicated control power supply fed from bus voltage.

In a first aspect of the present invention a power converter stage for providing power supply to a power converter controller is presented, comprising, a first power storing means on an input side of the power converter stage, a second power storing means on an output side of the power converter stage, circuitry for power conversion including a primary inductance, and a secondary inductance inductively coupled to the primary inductance for supplying power to the power converter controller, wherein the circuitry is controllable to transfer power through the primary inductance from the first power storing means to the second power storing means and from the second power storing means to the first power storing means.

In a further aspect of the present invention a controller for such power converter stage is presented, wherein the controller is arranged for controlling the circuitry for transferring power through the primary inductance from the first power storing means to the second power storing means and from the second power storing means to the first power storing means.

In a yet further aspect of the present invention a power converter is presented including such power converter stage and such controller.

It was realized that the power stored in power storing means included in a power converter stage or more generally in a power converter may be used for supply to a controller even if the power converter is in stand-by mode, as a transfer of power between such power storing means through a primary inductance provides also for a power transfer to a secondary inductance, which then supplies the controller. The internal transfer of power, however, does not interfere with the status of stand-by.

It was further found that the present invention is also compliant with the goal of high efficiency of the system during a stand-by. An analysis showed that stand-by losses of the converter according to the present invention are not higher than the losses of other known solutions.

If the power converter stage is coupled or provided with an appropriate controlling device (like the above mentioned controller), the power converter stage is provided with a control for transferring power through the primary inductance from the first power storing means to the second power storing means and from the second power storing means to the first power storing means.

In a preferred embodiment of the power converter stage, the first and/or second power storing means is a capacitor.

Already conventional power converters or power converter stages are provided with capacitors, in particular filtering and bus capacitors which may also be used as power storing means.

In a preferred embodiment of the power converter stage, the circuitry further includes a first and a second switch, wherein the arrangement of the primary inductance, the first switch and the second switch corresponds to a synchronous boost converter, wherein preferably at least one of the first and second switch is a power MOSFET, i.e. preferably either the first switch is a power MOSFET, or the second switch is a power MOSFET, or both switches are power MOSFETS.

The design of a synchronous boost converter, which might be designed cost-effectively based on power MOSFET switches allows for a switching between a boost conversion in one direction and a buck conversion in the opposite directions just by controlling the switches.

In a another embodiment of the power converter stage, the circuitry includes a third and a fourth switch and a first and a second diode, wherein third switch and the first diode are arranged with the primary inductance to form a boost converter for transferring power from the first power storing means to the second power storing means, and wherein the fourth switch and the second diode are arranged with the primary inductance to form a buck converter for transferring power from the second power storing means to the first power storing means.

If design or other constraints prohibit the provision of an arrangement like the synchronous boost converter discussed above, it may still be possible to provide a boost converter arrangement and a buck converter arrangement with opposite directions in parallel.

In a modification of the previous embodiment of the power converter stage, the primary inductance includes a first inductance element and a secondary inductance element, wherein the first inductance element is included in the boost converter and the secondary inductance element is included in the buck converter.

Even though a common use of the primary inductance by both, the buck converter and the boost converter arrangement is preferable, it is also possible to provide two inductance elements, which form the primary inductance.

In a preferred embodiment of the power converter controller, in particular provided for a power converter stage having the circuitry including a first and a second switch, wherein the arrangement of the primary inductance, the first switch and the second switch corresponds to a synchronous boost converter, the controller is arranged to control the circuitry in a boost mode for transferring power from the first power storing means through the primary inductance to the second power storing means and to control the circuitry in a buck mode for transferring power from the second power storing means through the primary inductance to the first power storing means.

As discussed above, the arrangement of the synchronous boost converter may advantageously be employed in the present invention, wherein the boost mode and the buck mode may be switched just by controlling the switches included in the power converter stage.

In a preferred embodiment of the power converter controller, the controller is arranged for stopping a transfer of power from the first power storing means to the second power storing means when the power remaining in the first power storing means reaches a predetermined first minimum value.

It is preferable to keep the power in the first power storing means above a certain threshold; in particular it is desirable to maintain a voltage across a capacitor forming the first power storing means above a peak value of the (rectified) mains in order to avoid an uncontrolled intake of power from the mains.

In a modification of the previous embodiment of the power converter controller, the first power storing means is a capacitor connected to a power supply and at the predetermined first minimum value the voltage across the first power storing means is higher than a peak value of the power supply.

In a preferred embodiment of the power converter controller, the controller is arranged for stopping a transfer of power from the second power storing means to the first power storing means when a power stored in the first power storing means reaches a predetermined first maximum value and/or when a difference between the voltage stored in the first power storing means and the voltage stored in the second power storing means reaches a predetermined second minimum value.

Such operation keeps the power stored in the first power storing means below a value which might endanger the safety of the first power storing means, while avoiding a too high change rate between directions of power transfer.

In a preferred embodiment of the power converter controller, the controller is arranged for controlling the circuitry for receiving power from a power supply connected to the first power storing means if the voltage stored in second power storing means reaches a predetermined third minimum value.

If necessary, the power stored in the power storing means, in particular in the second power storing means, may be supplemented from the mains. In any case, preferably, energy is only drawn from the mains when the energy content in the second power storing means has dropped below such minimum value, wherein the energy transfer from mains to the second power storing means is stopped again once a maximum power level is reached, wherein the maximum power level is determined to avoid component damage.

In a preferred embodiment of the power converter controller, the controller is arranged for stopping any transferring of power between the first and the second power storing means once a voltage provided by the secondary inductance reaches a predetermined second maximum value, and for resuming transferring of power between the first and the second power storing means once the voltage provided by the secondary inductance falls to a predetermined fourth minimum value.

Such operation keeps the voltage generated or provided by the secondary inductance in a desired range, wherein furthermore the desired range influences the extent to which the transfer of power is stopped, which in turn is relevant for the amount of possible losses.

In another aspect of the present invention a method for providing power to a controller of a power converter is presented, including the steps of providing a power converter stage according to the present invention, and during stand-by of the power converter, transferring in turn power through the primary inductance from the first power storing means to the second power storing means and from the second power storing means to the first power storing means.

In yet a further aspect of the present invention a software product is presented for controlling a power converter, the software product comprising program code means for causing a transferring in turn of power through the primary inductance from the first power storing means to the second power storing means and from the second power storing means to the first power storing means to be carried out when the software product is run on a controller according to the present invention in a power converter according to the present invention.

It shall be understood that the power converter stage of claim 1, the controller of claim 6, the power converter of claim 13, the method for providing power to a controller of a power converter of claim 14, and the software product of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
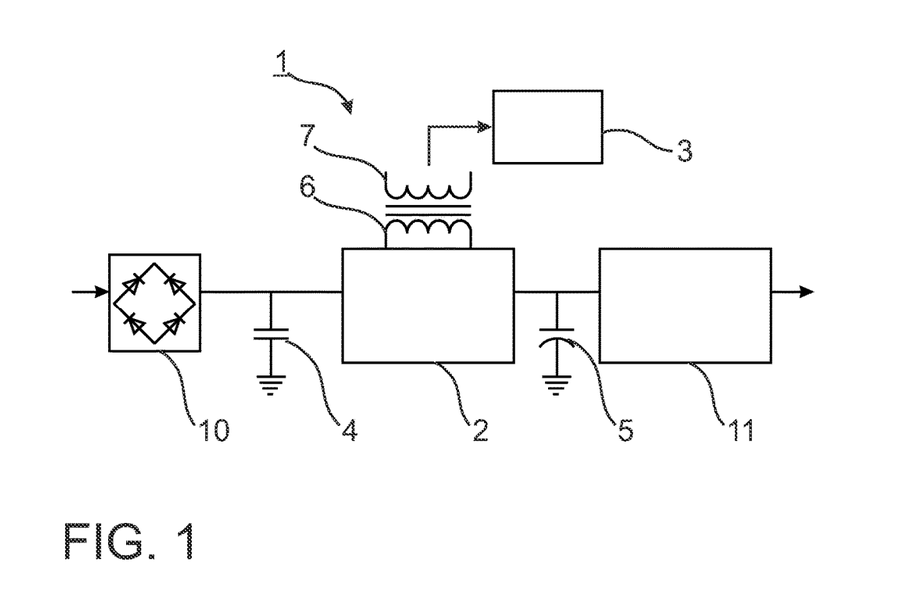
FIG. 1 shows an embodiment of a power converter according to the present invention.

FIG. 1 shows an embodiment of a power converter 1 according to the present invention.

The power converter 1 includes a bridge rectifier 10 connected to the mains input (not shown) and to a filtering capacitor 4 (first power storing means). The filtering capacitor 4 is also connected to a power converter stage 2, which includes a primary winding 6 (primary inductance). The primary winding 6 is inductive coupled to a secondary or auxiliary winding 7 (secondary inductance), which is arranged for supplying power to a controller 3 of the power converter 1. In the shown embodiment, the power converter stage 2 is the first stage of the power converter 1 and thus connected to a bus capacitor 5 (second power storing means), which is connected to a second or output stage 11 of the power converter 1. The output stage is arranged for supplying power to the load (not shown).

The arrangement as described above basically corresponds to that of a conventional power converter with an integrated auxiliary supply as discussed at the beginning of this description.

However, the internal arrangement of the power converter stage 2 and the controller 3 and the operation during stand-by of the power converter 1 is different from the conventional case.

Figure 2:
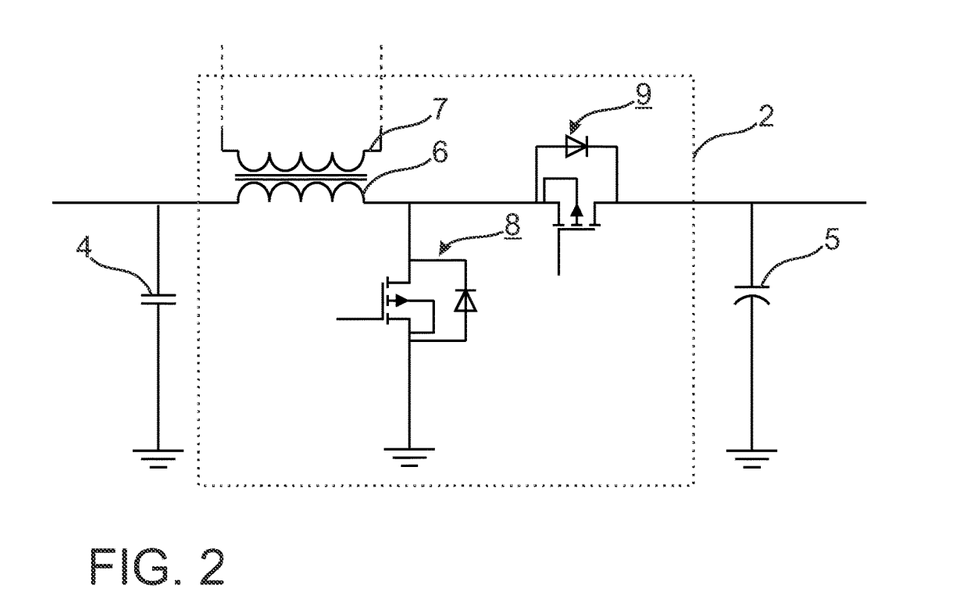
FIG. 2 shows details of an embodiment of a power converter stage for the power converter shown in FIG. 1.

FIG. 2 shows details of an embodiment of a power converter stage 2 for the power converter 1 shown in FIG. 1.

The power converter stage 2 is connected to the filtering capacitor 4 acting as the first power storing means and the bus capacitor 5 acting as the second power storing means. The power converter stage 2 includes the primary winding 6 (inductively coupled with the auxiliary winding 7), a first power MOSFET 8 (first switch) and a second power MOSFET 9 (second switch). The primary winding 6 and the second switch 9 are provided in line between the connections to the filtering capacitor 4 and the bus capacitor 5 (which are both connected to ground), while the first switch 8 connected a point between the primary winding 6 and the second switch 9 also with ground. This kind of circuitry is known as a synchronous boost converter.

An alternative embodiment (not shown) of the invention includes for a boost converter arrangement and a buck converter arrangement provided in parallel, wherein the first power storing means is arranged as a source for the boost converter and a load for the buck converter, while the second power storing means is arranged for a load for the boost converter and a source for the buck converter. The boost converter and the buck converter may be provided by dedicated elements, wherein it is also considered that the boost converter and the buck converter share a common inductance.

Figure 6:
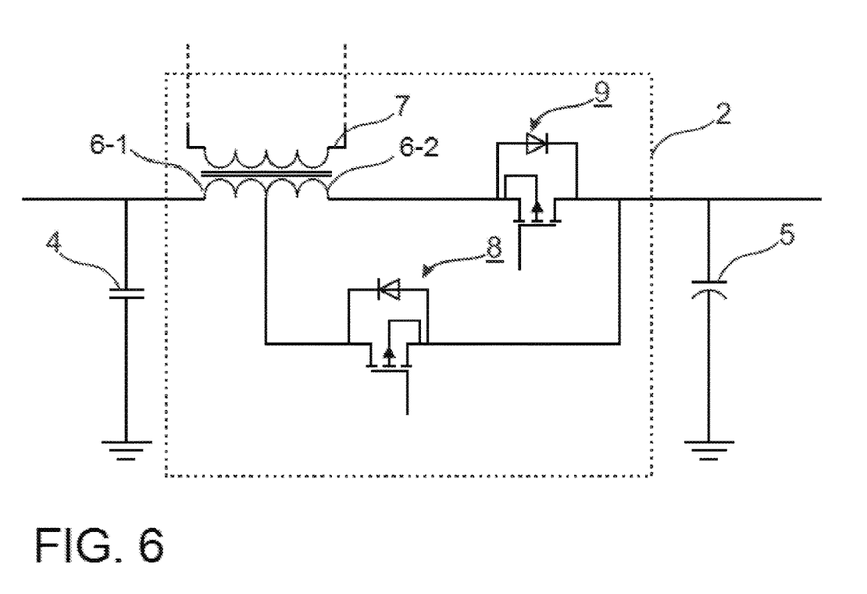
FIG. 6 shows details of an embodiment of a power converter stage for the power converter shown in FIG. 1.

An alternative embodiment (shown in FIG. 6) of the invention includes for a boost converter arrangement and a buck converter arrangement provided in parallel, wherein the first power storing means is arranged as a source for the boost converter and a load for the buck converter, while the second power storing means is arranged for a load for the boost converter and a source for the buck converter. The boost converter and the buck converter may be provided by dedicated elements, wherein it is also considered that the primary inductance includes a first inductance element 6-1 and a secondary inductance element 6-2, wherein the first inductance element is included in the boost converter and the secondary inductance element is included in the buck converter.

In the embodiment illustrated in FIG. 2, however, the switch and the diode of a boost converter or a buck converter are provided by switches 8 and 9 (power MOSFETs), such that the circuitry may act as both, as a boost converter and as a buck converter (even though for different directions of flow of energy).

In the normal mode of operation (corresponding to the operation of a conventional power converter with integrated auxiliary supply), the power converter stage 2 is operated in boost mode and the energy required by the load (not shown, via the second stage 11) is supplied to the bus capacitor 5. At the same time, via the auxiliary winding 7, energy is supplied to the controller 3.

During stand-by mode, energy from bus capacitor 5 is used to supply the controller 3 (i.e. to generate the auxiliary supply). Energy is transferred from the bus capacitor 5 to the filtering capacitor 4 and back, enabling that energy is supplied to the auxiliary winding 7.

A control algorithm of the power converter stage 2 is described as follows.

In a stand-by buck mode, the power converter stage 2 works as a buck converter and transfers energy from the bus capacitor 5 to the filtering capacitor 4. During this mode only the second switch 9 is operated. The voltage across the filtering capacitor 4 increases. In order for preventing the intake of power from the mains, the minimal value of this voltage across the filtering capacitor 4 has to be higher than a peak of the rectified mains voltage (via the bridge rectifier 10), unless some other means for separating the filtering capacitor 4 from the mains is employed). During stand-by, the power converter stage 2 is operated in buck mode until the difference between the bus voltage (voltage across the bus capacitor 5) and the voltage across the filtering capacitor 4 reaches a given value (a predetermined second minimum value). Alternatively or additionally, the operation in buck mode may be terminated once the voltage across the filtering capacitor reaches a given value (a predetermined first maximum value) regardless of the difference to the voltage across the bus capacitor 5.

When the voltage across the filtering capacitor 4 reaches its maximal value (i.e. either based on the difference to the voltage of the bus capacitor or in absolute terms), the power converter stage 2 is operated in (stand-by) boost mode and energy is transferred back from the filtering capacitor 4 to the bus capacitor 5. During this mode, only the first switch 8 is operated. The power converter stage 2 works in boost mode until the voltage across the filter capacitor reaches a minimal value (a predetermined first minimum value). This minimal value, as explained, has to be somewhat higher than the peak value of the rectified mains, if it is to be prevented that energy is transferred from the mains to the converter.

In case that the voltage across bus capacitor 5 becomes too low (i.e. reaches a predetermined third minimum value), the power converter stage 2 is operated in boost mode (corresponding to normal operation, except for the second stage 11 remaining in stand-by) so that energy is supplied from the mains to the bus capacitor 5. This mode is active until the value of the bus voltage reaches its nominal value. Afterwards, the power converter stage is operated again in buck-boost mode (provided the stand-by is still applicable).

In addition to the described control algorithm as described above, another control loop is provided. This hysteretic control loop checks the value of auxiliary supply voltage. If it reaches a given maximal value (a predetermined second maximum value), the power converter stage 2 is stopped, i.e. set to a hold mode. When the voltage value drops to its minimal level (a predetermined fourth minimum value), the power converter stage operation is recovered to the state where it was before entering the hold mode.

Figure 3:
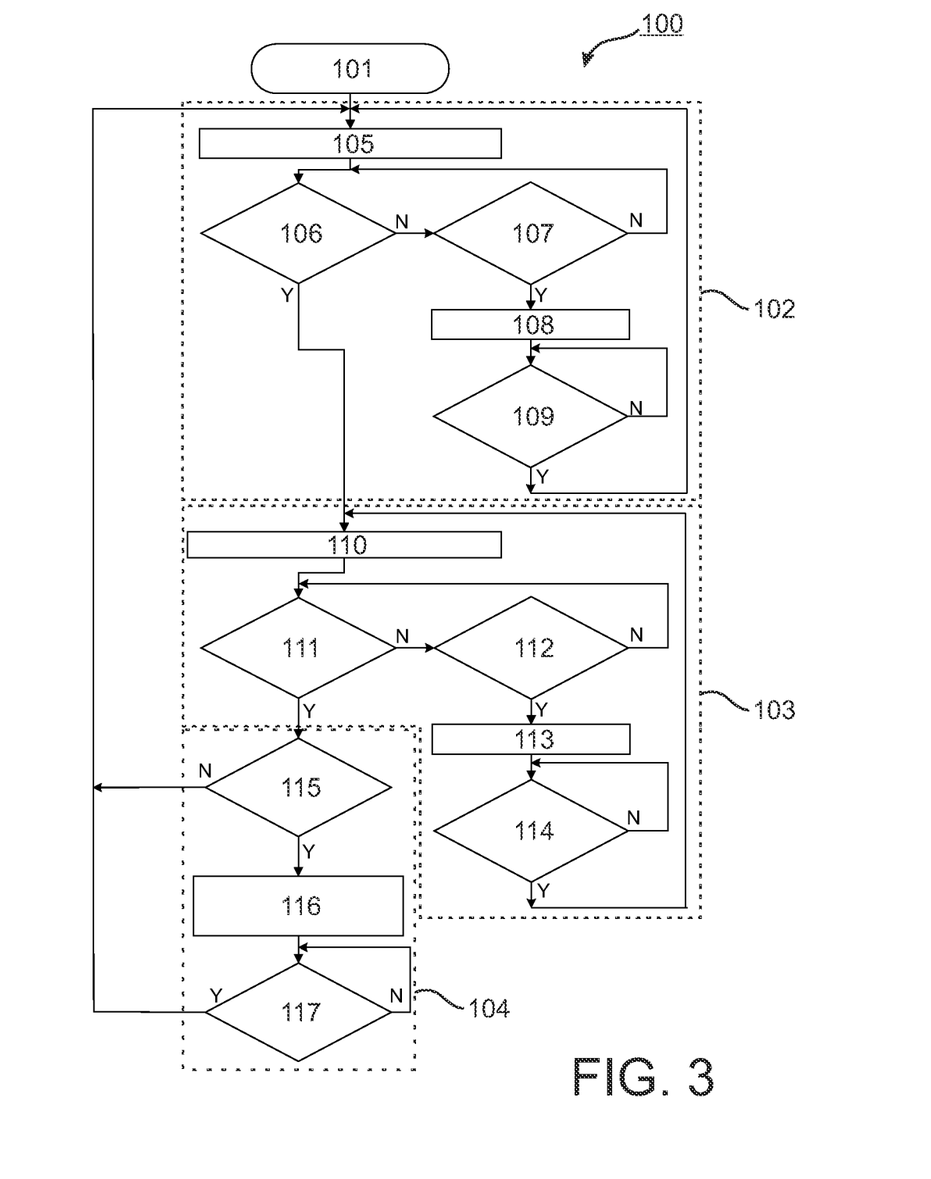
FIG. 3 shows a flowchart illustrating the operation of the power converter stage.

FIG. 3 shows a flowchart illustrating the operation 100 of the power converter stage 2.

Upon entering the stand-by mode (step 101), the operation proceeds to a stand-by buck mode 102 (see above), followed by a stand-by boost mode 103 (see above) and a normal boost mode 104 (see above).

In the stand-by buck mode 102, the power converter stage is controlled (step 105) to be in the buck mode of transferring power from the second power storing means to the first power storing means, thereby providing power to the controller via the secondary inductance. The voltage across the first power storing means is checked (step 106) against a predetermined first maximum value and if the voltage is too high, the operation proceeds to the stand-by boost mode 103. If the voltage across the first power storing means is not too high, the voltage provided by the secondary inductance is checked (step 107) against a predetermined second maximum value. If the voltage is not too high, the operation returns to check 106. If the voltage provided by the secondary inductance reaches or exceeds the predetermined second maximum value, the transferring of power from the second power storing means to the first power storing means is stopped (step 108), which state is maintained until a check (step 109) determines that the voltage provided by the secondary inductance is too low (i.e. falls to or below a predetermined fourth minimum value). In such case, the power converter stage is controlled (step 105) to be again in the buck mode.

Upon entering the stand-by boost mode 103, the power converter stage is controlled (step 110) to be in the boost mode of transferring power from the first power storing means to the second power storing means, thereby providing power to the controller via the secondary inductance. The voltage across the first power storing means is checked (step 111) against a predetermined first minimum value and if the voltage is too low, the operation proceeds to the normal boost mode 104. If the voltage across the first power storing means is not too low, the voltage provided by the secondary inductance is checked (step 112) against the predetermined second maximum value. If the voltage is not too high, the operation returns to check 111. If the voltage provided by the secondary inductance reaches or exceeds the predetermined second maximum value, the transferring of power from the first power storing means to the second power storing means is stopped (step 113), which state is maintained until a check (step 114) determines that the voltage provided by the secondary inductance is too low (i.e. falls to or below the predetermined fourth minimum value). In such case, the power converter stage is controlled (step 110) to be again in the boost mode.

Upon entering the normal boost mode 104, the voltage across the second power storing means is checked (step 115) against a predetermined third minimum value. If the voltage is not too low, the operation proceeds to the stand-by buck mode 102. If the voltage is too low, the power converter stage is controlled (step 116) to be in a normal boost mode (corresponding to normal operation, i.e. not stand-by), which is maintained until the voltage across the second power storing means is considered to be sufficiently high (check in step 117).

The control as illustrated in FIG. 3 provides that the controller 3 takes care that voltages across both filtering capacitor 4 (first power storing means) and bus capacitor 5 (second power storing means) remain in a desired range, while also ensuring that the power supply to the controller remains in a predetermined range.

Figure 4:
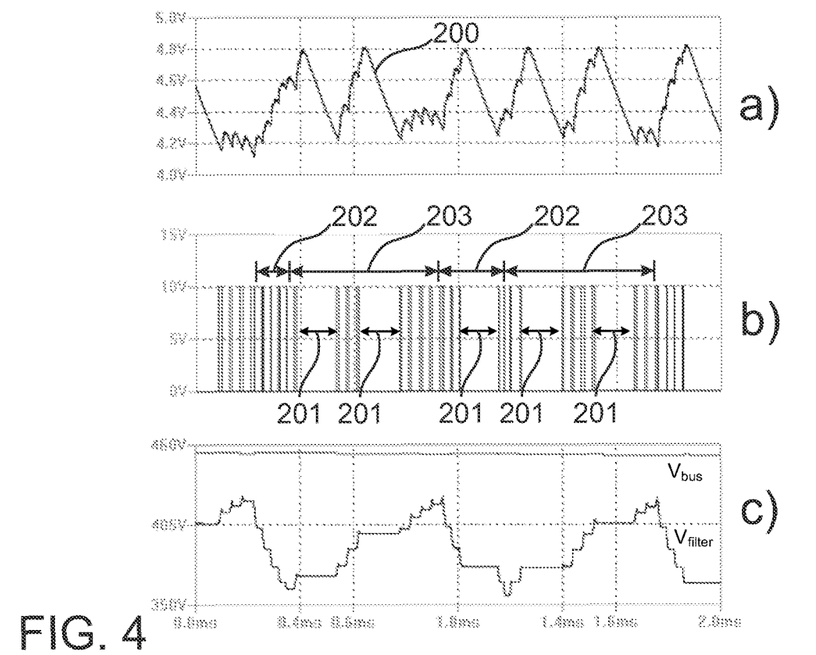
FIGS. 4 and 5 show simulation waveforms according to an embodiment of a control operation of the present invention.
Figure 5:
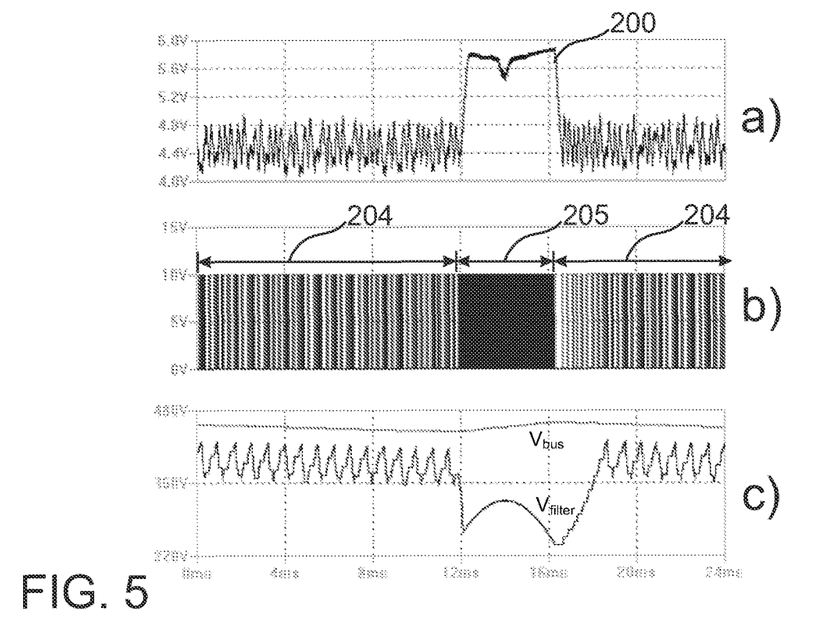

FIGS. 4 and 5 show simulation waveforms according to an embodiment of a control operation of the present invention.

The top waveform of FIG. 4a shows that the voltage 200 of the auxiliary supply changes between two thresholds, in this case basically 4.2 V and 4.8 V. Every time it reaches upper threshold, the power converter stage is put to a hold state (see periods 201 and steps 108 or 113 of FIG. 3). When it drops to lower threshold, the operation is restored (see FIG. 4b).

After the voltage $V_{filter}$ across the filtering capacitor reaches an upper threshold (see FIG. 4c), the power converter stage is set to the stand-by boost mode (see periods 202). After this voltage $V_{filter}$ reaches a lower threshold, the power converter stage is operated in buck mode (see periods 203). The value of the bus voltage $V_{bus}$ (i.e. the voltage across the bus capacitor) gradually drops over time as the energy is used to supply the auxiliary circuitry of the controller.

FIG. 5 shows the results from the same simulation as that of FIG. 4, just over a longer time period. FIG. 5 shows that the power converter stage is operated in stand-by buck-boost mode (see periods 204) until the bus voltage reaches its lower threshold (0 ms-12 ms). From that moment, the power converter stage is operated in normal boost mode (see period 205), charging the bus capacitor from the mains (12 ms-16 ms). Afterwards, it returns to buck-boost mode (see periods 204). In any mode of operation, energy is transferred to the auxiliary supply.

By applying the present invention, a power converter stage (in particular an input power stage) can be operated during stand-by without causing an over-voltage across the bus capacitor includes in the power converter. In each of the modes of operation, energy is transferred to the control circuitry via auxiliary winding.

Although the power converter stage is operated during stand-by, losses may be expected as being very low, in particular thanks to a burst operation of power converter stage. The overall system can easily be designed so that the power converter stage operates in the hold mode most of time.

According to one implementation of the present invention the auxiliary supply is integrated in one of the stages of a power converter, wherein in comparison to a conventional integrated auxiliary power supply technical changes in that stage of the power converter are provided which enable that the integrated auxiliary supply can be used also during stand-by operation of the power converter without risking over-voltage across buffer capacitors and activating the load (e.g. the LED in an lighting application). An auxiliary winding is integrated in the inductor of one or more power stages of a converter. Instead of passive semiconductors, the corresponding power stage comprises active semiconductors. For example, if a boost converter is considered (used as a PFC input stage), two semiconductor switches (e.g. MOSFETs) are used instead of a switch and a diode, resulting in a so-called synchronous boost converter. The controller of the converter is able to drive the power stage so that power can be transferred in both directions. Taking the example of a PFC stage, the controller is able to operate the PFC in both, boost and buck modes. When operated in boost mode, energy is transferred to a bus capacitor provided between the first and second stage of the power converter, and when operated as in buck mode energy is transferred back to the filtering capacitor provided between a bridge rectifier (connected to the mains) and the first stage. As the auxiliary supply is integrated in the input power stage, the voltage across the capacitor placed between the diode-bridge and the input power stage (i.e. the filtering capacitor) is kept to be higher than the peak value of the rectified mains voltage, in order to ensure that no power is delivered from the mains during stand-by of the converter.

In the claims, the word "comprising" does not exclude other elements or steps, and the indefinite article "a" or "an" does not exclude a plurality.

An indication that a value is between a lower limit and an upper limit, inclusive, is to be understood and that the value may have any value inside the given range including the values of the lower limit and the upper limit.

A single unit or device may fulfill the functions of several items recited in the claims. The mere fact that certain measures are recited in mutually different dependent claims does not indicate that a combination of these measures cannot be used to advantage.

Operations like detecting, measuring, switching, and controlling can be implemented as program code means of a computer program (or software product) and/or as dedicated hardware.

A software product or computer program may be stored/distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A power converter including a power converter stage for providing a power supply to a power converter controller, comprising:
   a first power storing component on an input side of the power converter stage,
   a second power storing component on an output side of the power converter stage,
   circuitry for power conversion including a primary inductance, and
   a secondary inductance inductively coupled to the primary inductance for powering the power converter controller,
      wherein the circuitry is configured for transferring, during stand-by of the power converter, power from the first power storing component through the primary inductance to the second power storing component and from the second power storing component through the primary inductance to the first power storing component.

2. The power converter according to claim 1, wherein at least one of the first or second power storing components is a capacitor.

3. The power converter according to claim 1, wherein the circuitry further includes a first and a second switch,
   wherein the arrangement of the primary inductance, the first switch and the second switch corresponds to a synchronous boost converter,
   wherein preferably at least one of the first and second switch is a power MOSFET.

4. The power converter according to claim 1, wherein the circuitry includes a first and a second switch and a first and a second diode,
   wherein the first switch and the first diode are arranged with the primary inductance to form a boost converter for transferring power from the first power storing component to the second power storing component, and
   wherein the second switch and the second diode are arranged with the primary inductance to form a buck converter for transferring power from the second power storing component to the first power storing component.

5. The power converter according to claim 4, wherein the primary inductance includes a first inductance element and a secondary inductance element, wherein the first inductance element is included in the boost converter and the secondary inductance element is included in the buck converter.

6. The power converter according to claim 3, wherein the controller is configured for controlling, during stand-by of the power converter, the circuitry for transferring power through the primary inductance from the first power storing component to the second power storing component and from the second power storing component to the first power storing component.

7. The power converter according to claim 6, wherein the controller is configured to control the circuitry in a boost mode for transferring power from the first power storing component through the primary inductance to the second power storing component and to control the circuitry in a buck mode for transferring power from the second power storing component through the primary inductance to the first power storing component.

8. The power converter according to claim 6, wherein the controller is configured for stopping a transfer of power from the first power storing component to the second power storing component when the power remaining in the first power storing component reaches a predetermined first minimum value.

9. The power converter according to claim 8, wherein the first power storing component is a capacitor connected to the power supply and
   wherein at the predetermined first minimum value the voltage across the first power storing component is higher than a peak value of the power supply.

10. The power converter according to claim 6, wherein the controller is configured for stopping a transfer of power from the second power storing component to the first power storing component
   when a power stored in the first power storing component reaches a predetermined first maximum value and/or when a difference between the voltage stored in the first power storing component and the voltage stored in the second power storing component reaches a predetermined second minimum value.

11. The power converter according to claim 6,
wherein the controller is configured for controlling the circuitry for receiving power from the power supply connected to the first power storing component if the voltage stored in second power storing component reaches a predetermined third minimum value.

12. The power converter according to claim 6,
wherein the controller is configured for
stopping any transferring of power between the first and the second power storing component once a voltage provided by the secondary inductance reaches a predetermined second maximum value, and for
resuming transferring of power between the first and the second power storing component once the voltage provided by the secondary inductance falls to a predetermined fourth minimum value.

13. A method for providing power to a controller of a power converter, including the steps:
providing the power converter according to claim 1, and
during stand-by of the power converter, transferring power from the first power storing component through the primary inductance to the second power storing component and from the second power storing component through the primary inductance to the first power storing component.

14. A non-transitory computer readable medium comprising a computer readable program for controlling the power converter according to claim 1, wherein the computer readable program when executed on a computer causes the computer to:
transfer, during stand-by of the power converter in turn of power through the primary inductance from the first power storing component to the second power storing component and from the second power storing component to the first power storing component.

* * * * *